United States Patent Office 3,026,321
Patented Mar. 20, 1962

3,026,321
NEW SUBSTITUTED 2,6-DIKETOPIPERAZINE
AND ITS MANUFACTURE
David K. de Jongh, Heemstede, Adriaan Kraaijeveld, Oegstgeest, and Geertruida C. van Leeuwen and Josephus F. Michels, Amsterdam, Netherlands, assignors to N.V. Nederlandsche Combinatie voor Chemische Industrie, Amsterdam, Netherlands, a company of the Netherlands
No Drawing. Filed Sept. 9, 1959, Ser. No. 838,852
4 Claims. (Cl. 260—268)

This invention concerns a new substituted 2,6-diketopiperazine and its manufacture.

This is a continuation-in-part of our application Serial Number 796,772, filed March 3, 1959, and now abandoned.

It has been found that the compound 4-[β-(3,4-dimethoxyphenyl)ethyl]-2,6-diketopiperazine is valuable owing to its specific depressant activity on the central nervous system in test animals as well as in human therapy. Regarding the activity in test animals the compound differs from the general depressants by specifically inhibiting conditioned responses. In accordance with this observation a pronounced tranquillizing activity was noted in human patients with anxiety states.

Further it has been found that the compound according to the invention may be prepared by heating β-(3,4-dimethoxyphenyl)ethyliminodiacetic acid with a slight excess of urea at a temperature above the melting point of the mixture, for example to temperatures within the range of from 150° C. to 210° C., preferably of from 170° C. to 190° C. The amount of urea used may vary, but for best results the amount is kept within the range of from 1 to 1.2 moles, preferably about 1.1 moles of urea per mole of the acid.

The starting material for this method may be prepared by heating β-(3,4-dimethoxyphenyl)ethylamine with at least a double molecular proportion of a monohalogenacetic acid, preferably monochloracetic acid, to temperatures between 40° C. and 60° C., preferably between 45° C. and 50° C., for from 5 to 30 hours, preferably 10 to 20 hours, in the presence of a sufficient amount of an acid binding agent. As a hydrogen halide binding agent may be used an alkali metal hydroxide, an alkali metal carbonate or an alkali metal bicarbonate. Preferably sodium hydroxide is used.

The following examples serve to illustrate the invention. The temperatures are given in degrees centigrade. The melting points are uncorrected.

Example 1

A solution of 24.1 grams of monochloracetic acid in 40 cc. of water is added to 25.3 grams of sodium hydroxide in 80 cc. of water at a temperature below 30°. Subsequently 27.7 grams of β-(3,4-dimethoxyphenyl)-ethylamine hydrochloride are added and 20 cc. of ethanol to keep the free amine in solution. The reaction mixture is heated to 45°–50° and kept at that temperature overnight. Thereafter concentrated hydrochloric acid is added until a pH of 2–3 is reached and the mixture is allowed to cool. The precipitate is filtered and dried, melting at 201°–203° after recrystallization from water. By adding fresh monochloracetic acid and sodium hydroxide to the residue and again heating overnight at 45°–50° another crop of crystals may be obtained in the same way.

17.2 grams of this β-(3,4-dimethoxyphenyl)ethyliminodiacetic acid are melted together with 3.8 grams of urea at a temperature of 150°–160°, and thereafter the temperature is raised to 170°–190°. After the first vigorous reaction has subsided, the reaction mixture is heated at the same temperature for another 30 minutes. The mixture is allowed to cool and the residue obtained is recrystallized from ethanol or from methylethylketone. It is also possible to sublime the reaction product. The sublimate is then recrystallized in the same way. A pure 4-[β-(3,4-dimethoxyphenyl)ethyl]-2,6-diketopiperazine is obtained, melting at 128°–129°.

Example 2

A solution of 20.9 grams of monochloracetic acid in 35 cc. of water is added to 22.6 grams of sodium hydroxide in 70 cc. of water at a temperature below 30°. Subsequently 24 grams of β-(3,4-dimethoxyphenyl)ethylamine hydrochloride in 25 cc. of alcohol are added. The reaction mixture is heated to 50° and kept at that temperature overnight. Monochloracetic acid and sodium hydroxide are again added and the mixture is again heated overnight to 50°. After evaporation of the alcohol a solution of barium chloride in water is added and the mixture is heated for half an hour on the steam bath. After cooling the precipitate is filtered and washed with hot water. The barium salt of the imino-acid is converted into the free acid by adding the calculated amount of sulphuric acid while boiling and stirring the mixture. The barium sulphate obtained is filtered by suction and washed carefully with boiling water. The filtrate is evaporated and the residue recrystallized from a mixture of water and alcohol. The acid melts at 201°–203°.

9 grams of this β-(3,4-dimethoxyphenyl)ethyliminodiacetic acid and 2 grams of urea are melted together. The mixture is heated to 190°–200° while the gases are removed under reduced pressure. After 35 minutes the mixture is allowed to cool to some extent and then dissolved in alcohol. By cooling this solution the 4-[β-(3,4-dimethoxyphenyl)-ethyl]-2,6-diketopiperazine is isolated with a melting point of 128°–129°.

What is claimed is:
1. The compound 4-[β-(3,4-dimethoxyphenyl)ethyl]-2,6-diketopiperazine.
2. The method of producing 4-[β-(3,4-dimethoxyphenyl)-ethyl]-2,6-diektopiperazine, comprising heating β-(3,4-dimethoxyphenyl)ethyliminodiacetic acid with urea in a proportion of from 1 to 1.2 moles of urea per mole of said acid to a temperature of from 150° C. to about 210° C. for a period of at least about 30 minutes.
3. The method of producing 4-[β-(3,4-dimethoxyphenyl)ethyl]-2,6-diketopiperazine comprising the steps of heating β-(3,4-dimethoxyphenyl)ethylamine with at least a double molecular proportion of a monohalogen-acetic acid at temperatures between 40° C. and 60° C. for from 5 to 30 hours in the presence of a hydrogen halide binding agent selected from the group consisting of alkali metal hydroxides, alkali metal carbonates and alkali metal bicarbonates, to yield β-(3,4-dimethoxyphenyl)ethyliminodiacetic acid and heating said iminodiacetic acid with urea in a proportion of from 1 to 1.2 moles of urea per mole of said iminodiacetic acid to a temperature of from

150° C. to about 210° C. for a period of at least about 30 minutes.

4. The method of producing 4-[β-(3,4-dimethoxyphenyl)ethyl] - 2,6 - diketopiperazine comprising the steps of heating β-(3,4-dimethoxyphenyl)ethylamine with at least a double molecular proportion of a monochloracetic acid at temperatures between 45° C. and 50° C. for from 10 to 20 hours in the presence of sodium hydroxide to yield β-(3,4-dimethoxyphenyl)ethyliminodiacetic acid and heating said iminodiacetic acid with urea in a proportion of about 1.1 moles of urea per mole of said iminodiacetic acid to a temperature of from 170° C. to 190° C. for a period of at least about 30 minutes.

References Cited in the file of this patent

UNITED STATES PATENTS

| | | |
|---|---|---|
| 2,762,804 | Safir | Sept. 11, 1956 |
| 2,762,805 | Safir | Sept. 11, 1956 |
| 2,861,072 | Weston et al. | Nov. 18, 1958 |

OTHER REFERENCES

Dubsky: Berichte Deutsche Chemische Gesellschaft, vol. 54, pages 2659–2667 (1921).